United States Patent
Itoh et al.

(10) Patent No.: US 12,447,939 B2
(45) Date of Patent: Oct. 21, 2025

(54) CONTROL DEVICE FOR VEHICLE AND VEHICLE CONTROL SYSTEM

(71) Applicant: TOYOTA JIDOSHA KABUSHIKI KAISHA, Toyota (JP)

(72) Inventors: Fumito Itoh, Susono (JP); Yusuke Suzuki, Hadano (JP); Kosuke Yamamoto, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 472 days.

(21) Appl. No.: 17/965,060

(22) Filed: Oct. 13, 2022

(65) Prior Publication Data

US 2023/0182701 A1    Jun. 15, 2023

(30) Foreign Application Priority Data

Dec. 10, 2021    (JP) ................... 2021-201106

(51) Int. Cl.
*B60T 8/32*    (2006.01)
*B60T 8/172*    (2006.01)

(52) U.S. Cl.
CPC .............. *B60T 8/329* (2013.01); *B60T 8/172* (2013.01); *B60T 2220/04* (2013.01)

(58) Field of Classification Search
CPC ...... B60T 8/172; B60T 8/329; B60T 2220/04; B60W 30/18072; B60W 50/082; B60W 2520/10; B60W 2520/06; B60W 2540/10; B60W 2720/106; B60W 256/05; B60W 256/06; B60W 256/10; B60W 256/45; B60W 256/50

USPC ...................................................... 188/181 R
See application file for complete search history.

(56) References Cited

U.S. PATENT DOCUMENTS

| | | | |
|---|---|---|---|
| 9,995,584 B1* | 6/2018 | Kanevsky | G01C 21/12 |
| 2017/0259828 A1* | 9/2017 | Yamaoka | B60W 10/06 |
| 2018/0118189 A1* | 5/2018 | Payne | B60L 7/18 |
| 2019/0256096 A1* | 8/2019 | Graf | G08G 1/096725 |
| 2021/0074091 A1* | 3/2021 | Wang | B60Q 9/008 |

FOREIGN PATENT DOCUMENTS

| | | |
|---|---|---|
| JP | 2007-168743 A | 7/2007 |
| JP | 2014-202643 A | 10/2014 |
| JP | 2018-193011 A | 12/2018 |
| JP | 2020-059367 A | 4/2020 |

* cited by examiner

*Primary Examiner* — Robert A. Siconolfi
*Assistant Examiner* — San M Aung
(74) *Attorney, Agent, or Firm* — Oliff PLC

(57) ABSTRACT

A control device for a vehicle configured to travel in a one-pedal mode in which driving and braking are controlled in response to operations on only an accelerator pedal is configured to control a braking force of the vehicle by using deceleration maps in which decelerations in a plurality of traveling directions are set for any points based on traveling history data, and calculate, during traveling in the one-pedal mode, a deceleration level based on deceleration information associated with a current traveling direction and a current position of the vehicle among pieces of deceleration information included in the deceleration maps.

8 Claims, 15 Drawing Sheets

FIG. 6

| | EXTRACTED DATA | | | | GENERATED DATA | | |
|---|---|---|---|---|---|---|---|
| | TIME | LONGITUDE | LATITUDE | G | Δ LONGITUDE | Δ LATITUDE | TRAVELING DIRECTION |
| | time | lng | lat | | lng(t)−lng(t−1) | lat(t)−lat(t−1) | |
| D1 | 14:25:31 | 139.031 | 35.24798 | 0.07 | | | |
| D2 | 14:25:32 | 139.0311 | 35.24793 | 0.08 | 0.00004 | −0.00005 | 1 |
| D3 | 14:25:33 | 139.0311 | 35.2478 | 0.08 | 0.00008 | −0.00013 | 1 |
| D4 | 14:25:34 | 139.0315 | 35.24709 | 0.09 | 0.00031 | −0.00071 | 1 |
| D5 | 14:25:35 | 139.0317 | 35.24663 | 0.10 | 0.00023 | −0.00046 | 1 |
| D6 | 14:25:36 | 139.0317 | 35.24659 | 0.11 | 0.00004 | −0.00004 | 1 |
| D7 | 14:25:37 | 139.0318 | 35.24656 | 0.13 | 0.00007 | −0.00003 | 1 |
| D8 | 14:25:38 | 139.0319 | 35.24656 | 0.15 | 0.00008 | 0.00000 | 3 |
| D9 | 14:25:39 | 139.0319 | 35.24657 | 0.11 | 0.00004 | 0.00001 | 3 |
| D10 | 14:25:40 | 139.0319 | 35.24658 | 0.10 | 0.00001 | 0.00001 | 3 |
| D11 | 14:25:41 | 139.032 | 35.2466 | 0.09 | 0.00007 | 0.00002 | 3 |
| D12 | 14:25:42 | 139.0323 | 35.24679 | 0.08 | 0.00026 | 0.00019 | 3 |
| D13 | 14:25:43 | 139.0323 | 35.2468 | 0.07 | 0.00002 | 0.00001 | 3 |
| D14 | 14:25:44 | 139.0326 | 35.24709 | 0.06 | 0.00037 | 0.00029 | 3 |
| D15 | 14:25:45 | 139.0329 | 35.24718 | 0.05 | 0.00024 | 0.00009 | 3 |
| D16 | 14:25:46 | 139.033 | 35.2472 | 0.04 | 0.00012 | 0.00002 | 3 |
| D17 | 14:25:47 | 139.0331 | 35.2472 | 0.03 | 0.00007 | 0.00000 | 3 |
| D18 | 14:25:48 | 139.0331 | 35.24721 | 0.02 | 0.00006 | 0.00001 | 3 |

CONTROL DEVICE FOR VEHICLE AND VEHICLE CONTROL SYSTEM

CROSS-REFERENCE TO RELATED APPLICATION

This application claims priority to Japanese Patent Application No. 2021-201106 filed on Dec. 10, 2021, incorporated herein by reference in its entirety.

BACKGROUND

1. Technical Field

The present disclosure relates to a control device for a vehicle and a vehicle control system.

2. Description of Related Art

Japanese Unexamined Patent Application Publication No. 2020-059367 (JP 2020-059367 A) discloses a control device for a vehicle capable of traveling in a one-pedal mode in which driving and braking are controlled in response to operations on only an accelerator pedal. When the accelerator pedal is released during traveling, the braking force is controlled to always stop the vehicle in a constant braking distance. To adjust a deceleration relative to the braking distance, the control device described in JP 2020-059367 A sets, as a target deceleration, a deceleration at which the braking distance reaches a target distance, and controls the braking force so that the vehicle speed follows a target vehicle speed.

SUMMARY

As a method for calculating the deceleration of the vehicle, a method using a traveling history data stored in a server or the like is conceivable in addition to a method using a value detected by an on-board sensor. In the method using the traveling history data stored in the server or the like, when calculating decelerations for individual points on a road included in the traveling history data, an average deceleration may be calculated in a predetermined range on the road and set for each range.

The average deceleration set in the predetermined range on the road is an average of pieces of data in various traveling directions. Therefore, the average deceleration does not accurately indicate a deceleration in each traveling direction. On a road such as a winding road where curves and slopes change, the requested deceleration varies depending on the traveling direction. Therefore, there is a possibility that the deceleration cannot be controlled appropriately. For example, deceleration feeling is insufficient at a point behind a downhill, thereby causing driver's anxiety.

The present disclosure has been made in view of the circumstances described above, and an object of the present disclosure is to provide a control device for a vehicle and a vehicle control system in which appropriate deceleration feeling can be given to a driver depending on a traveling direction of the vehicle.

A control device for a vehicle according to the present disclosure is a control device for a vehicle configured to travel in a one-pedal mode in which driving and braking are controlled in response to operations on only an accelerator pedal. The control device includes an electronic control unit configured to control a braking force of the vehicle by using deceleration maps in which decelerations in a plurality of traveling directions are set for any points based on traveling history data, and calculate, during traveling in the one-pedal mode, a deceleration level based on deceleration information associated with a current traveling direction and a current position of the vehicle among pieces of deceleration information included in the deceleration maps.

According to this configuration, the information in consideration of the traveling direction is extracted from the traveling history data. Therefore, the deceleration of the vehicle can be controlled based on the deceleration information associated with the current traveling direction and the current position of the vehicle during the traveling in the one-pedal mode. As a result, a burden on a driver due to the accelerator pedal operation can be reduced, and appropriate deceleration feeling can be given to the driver depending on the current traveling direction.

The deceleration level may include a plurality of deceleration levels in which a maximum deceleration generated when the accelerator pedal is released is set to different magnitudes stepwise. The electronic control unit may be configured to automatically change a setting to the calculated deceleration level during the traveling in the one-pedal mode, and calculate a requested deceleration based on the set deceleration level when controlling the braking force of the vehicle.

According to this configuration, it is possible to automatically switch to the deceleration level depending on the current traveling direction during the traveling. As a result, the operation for switching the deceleration level can be reduced.

The electronic control unit may be configured to transmit current position information of the vehicle to a server during the traveling in the one-pedal mode, receive, from the server, the deceleration maps in a peripheral range around a current position corresponding to the position information, and calculate, during the traveling in the one-pedal mode, the deceleration level based on the deceleration information associated with the current traveling direction and the current position of the vehicle in the received deceleration maps in the peripheral range around the current position.

According to this configuration, it is possible to provide the driver with appropriate deceleration feeling depending on the traveling direction by using the information in the peripheral range around the current position.

The electronic control unit may be configured to transmit current position information of the vehicle to a server during the traveling in the one-pedal mode, receive, from the server, the deceleration level calculated by the server based on the position information, and set a requested deceleration by using the received deceleration level during the traveling in the one-pedal mode.

According to this configuration, the calculation load on the vehicle can be reduced.

The electronic control unit may be configured to transmit current position information of the vehicle to a server during the traveling in the one-pedal mode, receive, from the server, the traveling history data in a peripheral range around a current position corresponding to the position information, and generate the deceleration maps based on the received traveling history data.

According to this configuration, the calculation load on the server can be reduced.

The traveling history data may include time information, position information, and deceleration information transmitted from a plurality of vehicles including the vehicle to a server.

According to this configuration, it is possible to provide the driver with appropriate deceleration feeling depending on the traveling direction by using the information in the peripheral range around the current position.

A vehicle control system according to the present disclosure includes a vehicle configured to travel in a one-pedal mode in which driving and braking are controlled in response to operations on only an accelerator pedal, and a server configured to communicate with the vehicle. The server is configured to generate deceleration maps in which decelerations in a plurality of traveling directions are set for any points based on traveling history data, and when current position information of the vehicle is received from the vehicle, transmit, to the vehicle, the deceleration maps associated with the current position information of the vehicle. The vehicle is configured to transmit the current position information of the vehicle to the server during traveling in the one-pedal mode, and calculate, when controlling a braking force of the vehicle during the traveling in the one-pedal mode, a deceleration level based on deceleration information associated with a current traveling direction and a current position of the vehicle among pieces of deceleration information included in the deceleration maps.

According to this configuration, the information in consideration of the traveling direction is extracted from the traveling history data. Therefore, the deceleration of the vehicle can be controlled based on the deceleration information associated with the current traveling direction and the current position of the vehicle during the traveling in the one-pedal mode. As a result, a burden on a driver due to the accelerator pedal operation can be reduced, and appropriate deceleration feeling can be given to the driver depending on the current traveling direction.

The deceleration level may include a plurality of deceleration levels in which a maximum deceleration generated when the accelerator pedal is released is set to different magnitudes stepwise. The vehicle may be configured to automatically change a setting to the calculated deceleration level during the traveling in the one-pedal mode, and calculate a requested deceleration based on the set deceleration level when controlling the braking force of the vehicle.

According to this configuration, it is possible to automatically switch to the deceleration level depending on the current traveling direction during the traveling. As a result, the operation for switching the deceleration level can be reduced.

The server may be configured to, when the current position information of the vehicle is received, transmit, to the vehicle, the deceleration maps in a peripheral range around the current position of the vehicle. The vehicle may be configured to transmit the current position information of the vehicle to the server during the traveling in the one-pedal mode, receive, from the server, the deceleration maps in the peripheral range around the current position corresponding to the position information, and calculate, during the traveling in the one-pedal mode, the deceleration level based on the deceleration information associated with the current traveling direction and the current position of the vehicle among the pieces of deceleration information included in the received deceleration maps in the peripheral range around the current position.

According to this configuration, it is possible to provide the driver with appropriate deceleration feeling depending on the traveling direction by using the information in the peripheral range around the current position.

The server may be configured to generate the deceleration maps in which traveling directions and decelerations of a predetermined vehicle are set for any points based on information indicating positions and the decelerations of the predetermined vehicle in the traveling history data.

According to this configuration, the calculation load on the vehicle can be reduced.

In the present disclosure, the information in consideration of the traveling direction is extracted from the traveling history data. Therefore, the deceleration of the vehicle can be controlled based on the deceleration information associated with the current traveling direction and the current position of the vehicle during the traveling in the one-pedal mode. As a result, the burden on the driver due to the accelerator pedal operation can be reduced, and appropriate deceleration feeling can be given to the driver depending on the current traveling direction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram showing an example of the traveling history data;

DETAILED DESCRIPTION OF EMBODIMENTS

Hereinafter, a control device for a vehicle and a vehicle control system according to an embodiment of the present disclosure will be described in detail with reference to the drawings. The present disclosure is not limited to the embodiment described below.

Figure 1:
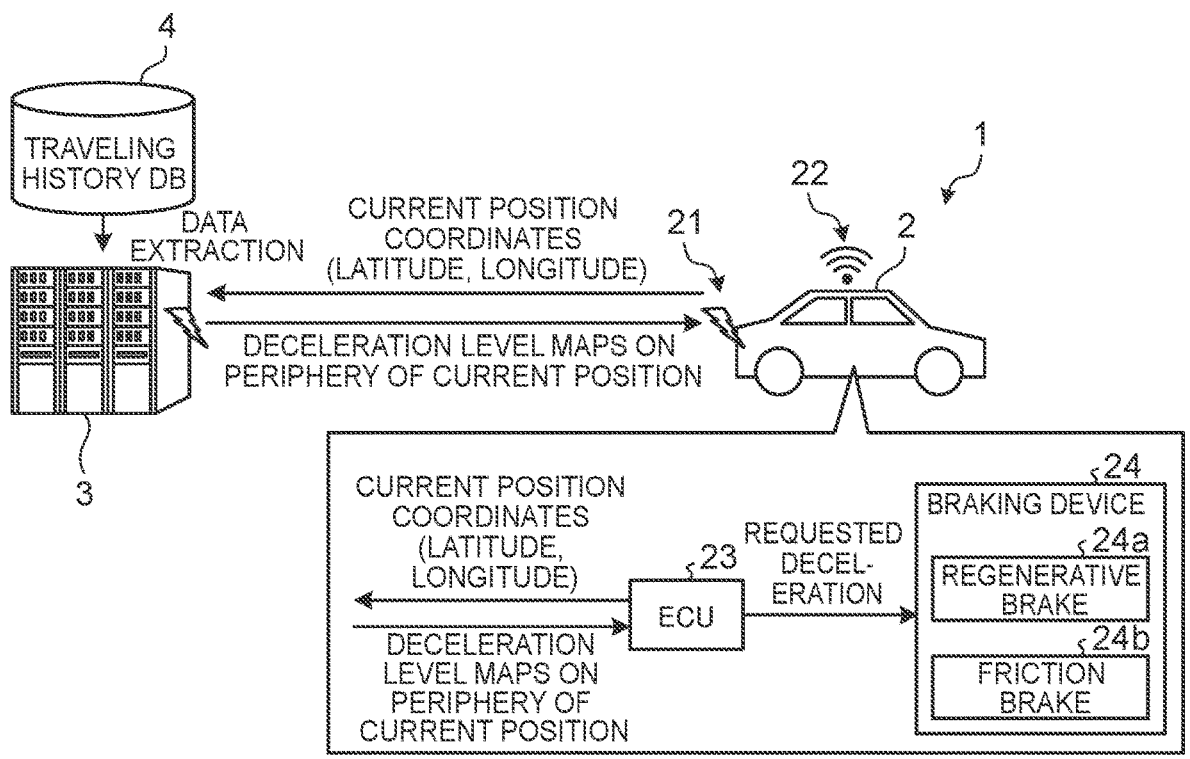
FIG. 1 is a diagram schematically showing an overall configuration of a vehicle control system according to an embodiment.
Figure 2:
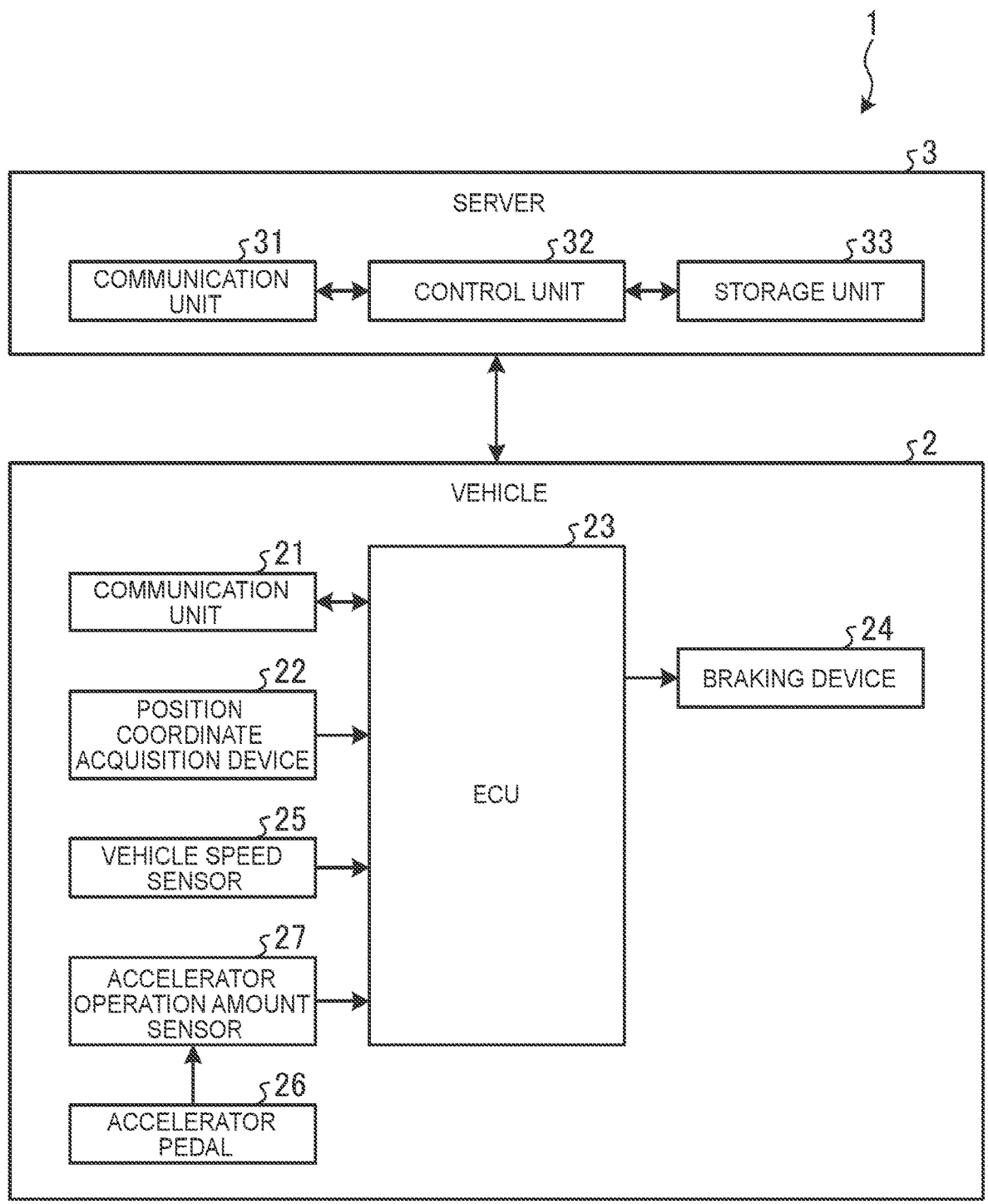
FIG. 2 is a block diagram showing a configuration of the vehicle control system.

FIG. 1 is a diagram schematically showing an overall configuration of the vehicle control system according to the embodiment. FIG. 2 is a block diagram showing a configuration of the vehicle control system.

A vehicle control system 1 includes a vehicle 2 and a server 3, and is configured to optimally control a deceleration depending on traveling conditions of the vehicle 2. The vehicle 2 is capable of adjusting a driving force and a braking force in response to operations on only an accelerator pedal 26. The server 3 is a management server installed in a management center or the like, and generates information necessary for braking control on the vehicle 2 based on traveling history data stored in a traveling history database 4. The server 3 can extract data from the traveling history database 4 and can wirelessly communicate with the vehicle 2. The server 3 provides information to the traveling vehicle 2. The traveling vehicle 2 controls the deceleration by using the information provided by the server 3. At that time, the vehicle 2 can set a requested deceleration by using information related to a deceleration based on a current traveling direction.

The vehicle 2 includes a communication unit 21, a position coordinate acquisition device 22, an electronic control unit (ECU) 23, and a braking device 24.

The communication unit 21 wirelessly communicates with the server 3. The communication unit 21 transmits information related to current position coordinates of the vehicle 2 to the server 3 and receives information provided by the server 3.

The position coordinate acquisition device 22 acquires information related to current position coordinates of the vehicle 2, and is, for example, a global positioning system (GPS) receiver. The information related to current position coordinates is position information indicating latitude and longitude. The position information acquired by the position coordinate acquisition device 22 is input to the ECU 23.

The ECU 23 is an electronic control unit that controls the vehicle 2. This electronic control unit is a microcomputer including a central processing unit (CPU), a random access memory (RAM), a read only memory (ROM), and an input/output interface. The ECU 23 performs signal processing based on programs prestored in the ROM. Signals are input to the ECU 23 from various sensors. Examples of the signals input to the ECU 23 include a vehicle speed signal from a vehicle speed sensor 25 that detects a vehicle speed of the vehicle 2, and an accelerator operation amount signal from an accelerator operation amount sensor 27 that detects an operation amount of the accelerator pedal 26 (accelerator operation amount). The ECU 23 executes various types of control based on the signals input from the various sensors.

For example, when executing driving control, the ECU 23 can execute a one-pedal mode in which driving and braking are controlled in response to operations on only the accelerator pedal 26. The ECU 23 can switch a plurality of traveling modes. The traveling modes include a normal mode in which the driving force and the braking force are adjusted in response to operations on the accelerator pedal 26 and a brake pedal, and the one-pedal mode in which the driving force and the braking force are adjusted in response to operations on only the accelerator pedal 26. The ECU 23 can switch the normal mode and the one-pedal mode in response to a request from a driver of the vehicle 2.

The ECU 23 calculates a requested driving force based on an accelerator operation amount and a vehicle speed during the one-pedal mode. The ECU 23 controls a traveling power source based on the requested driving force. The traveling power source includes an engine, a motor, and the like. That is, the vehicle 2 may be any one of a vehicle including only an engine as its power source, a hybrid electric vehicle including an engine and a motor, and a battery electric vehicle including only a motor as its power source.

During the one-pedal mode, the ECU 23 calculates a requested deceleration based on information acquired from the server 3, position information acquired by the position coordinate acquisition device 22, and a vehicle speed. The ECU 23 controls the braking device 24 based on the requested deceleration. That is, the ECU 23 controls the braking force to be generated by the braking device 24.

The braking device 24 is a brake that generates a braking force of the vehicle 2. The braking device 24 includes a regenerative brake 24a and a friction brake 24b. The regenerative brake 24a functions by applying, to wheels, a braking force generated when the motor mounted on the vehicle 2 performs regeneration. The friction brake 24b is a brake such as an electric brake or a hydraulic brake that generates a frictional force by an actuator to apply a braking force to the wheels.

The server 3 includes a communication unit 31, a control unit 32, and a storage unit 33.

The communication unit 31 wirelessly communicates with the vehicle 2. The communication unit 31 receives current coordinate position information transmitted from the vehicle 2, and transmits, to the vehicle 2, information necessary for the vehicle 2 to travel. The communication unit 31 can communicate with the traveling history database 4. The communication unit 31 receives the traveling history data stored in the traveling history database 4.

The control unit 32 is an electronic control unit that performs information processing for controlling the braking force of the vehicle 2. The control unit 32 has the same hardware configuration as the ECU 23. The control unit 32 executes various types of control based on information stored in the storage unit 33.

The storage unit 33 stores the traveling history data acquired from the traveling history database 4, deceleration maps generated by the control unit 32, information received from the vehicle 2, and the like.

Figure 3:
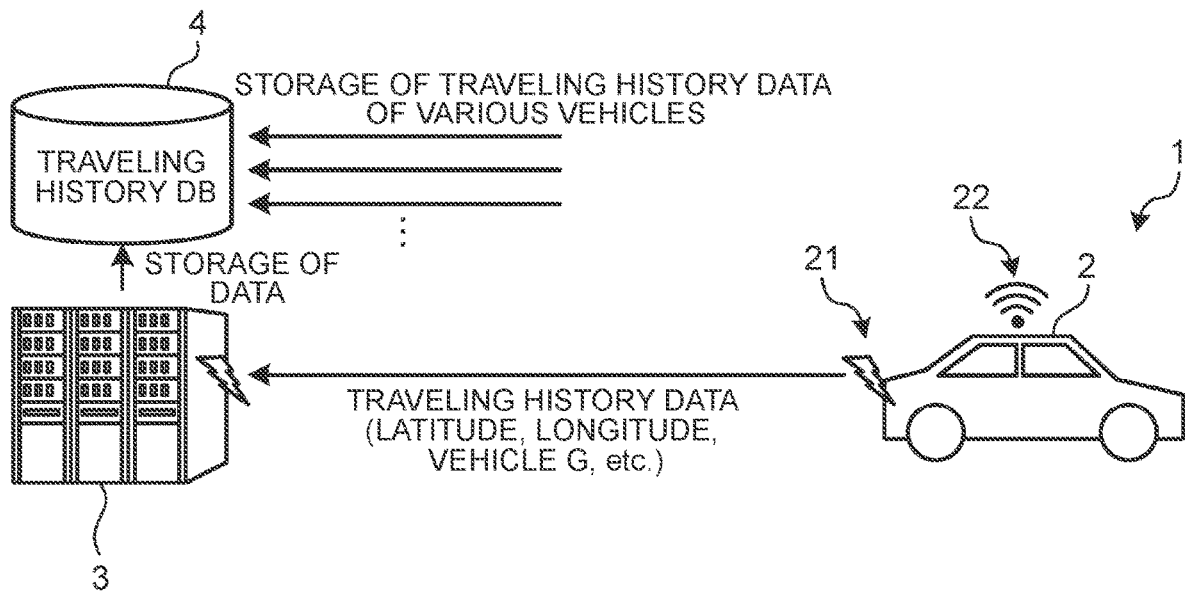
FIG. 3 is a diagram for describing a flow when collecting traveling history data.

The traveling history database 4 stores the traveling history data. The traveling history data is information indicating traveling records of a predetermined vehicle. The traveling history data includes time information, position information (latitude, longitude), and deceleration information. The traveling history data is big data composed of information on a plurality of vehicles. Examples of a method for collecting the traveling history data include the following method. As shown in FIG. 3, the server 3 receives traveling history data of the vehicle 2, stores the data in the traveling history database 4, and collects, in the traveling history database 4, traveling history data of various vehicles acquired through collection routes without intermediation of the server 3. The traveling history data transmitted by the vehicle 2 to the server 3 includes a traveling time, a latitude, a longitude, and a deceleration.

Figure 4:
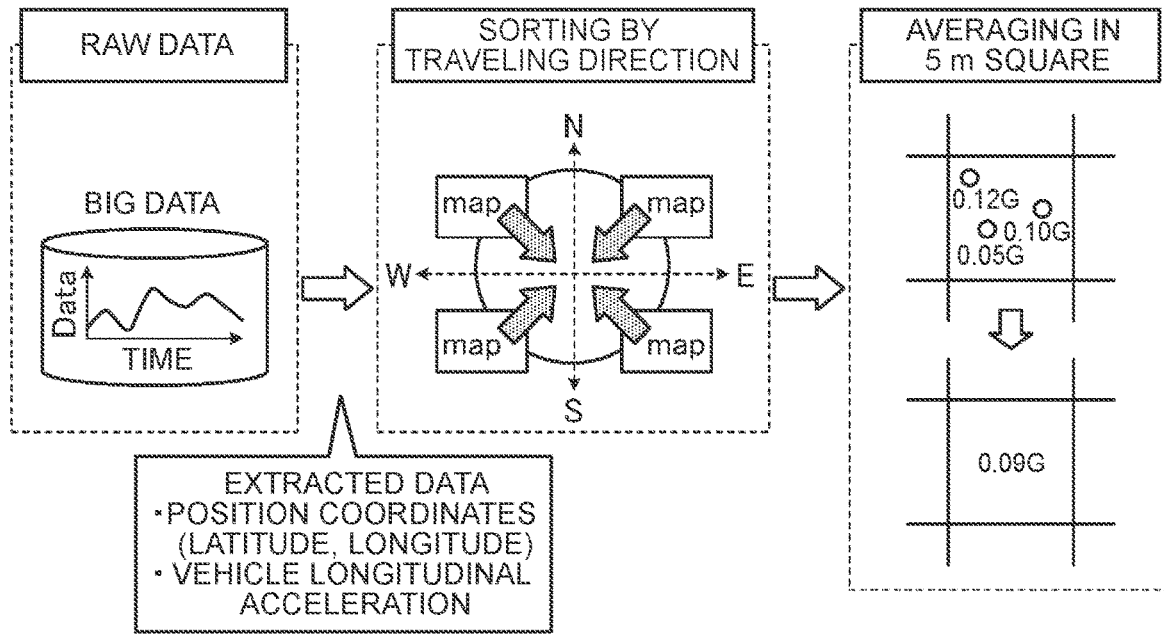
FIG. 4 is a diagram for describing a deceleration map generation flow.

Based on the big data stored in the traveling history database 4, the server 3 generates information to be used for braking the vehicle 2. Specifically, as shown in FIG. 4, the server 3 sorts the data for each traveling direction based on the traveling history data that is the big data, and averages decelerations at individual points on a road. The method for generating the information to be used for braking the vehicle 2 includes a sorting step for sorting the traveling history data into pieces of information for individual traveling directions, and a calculation step for averaging pieces of acceleration information after the sorting for each predetermined range. The predetermined range is set to, for example, a range of 5 m square. The decelerations are averaged and set for the predetermined range. As a result, a deceleration level map is generated as the information to be used for braking the vehicle 2. The deceleration level map is a deceleration map including deceleration information in which a deceleration is set for each traveling direction at any point on a road.

Figure 5:
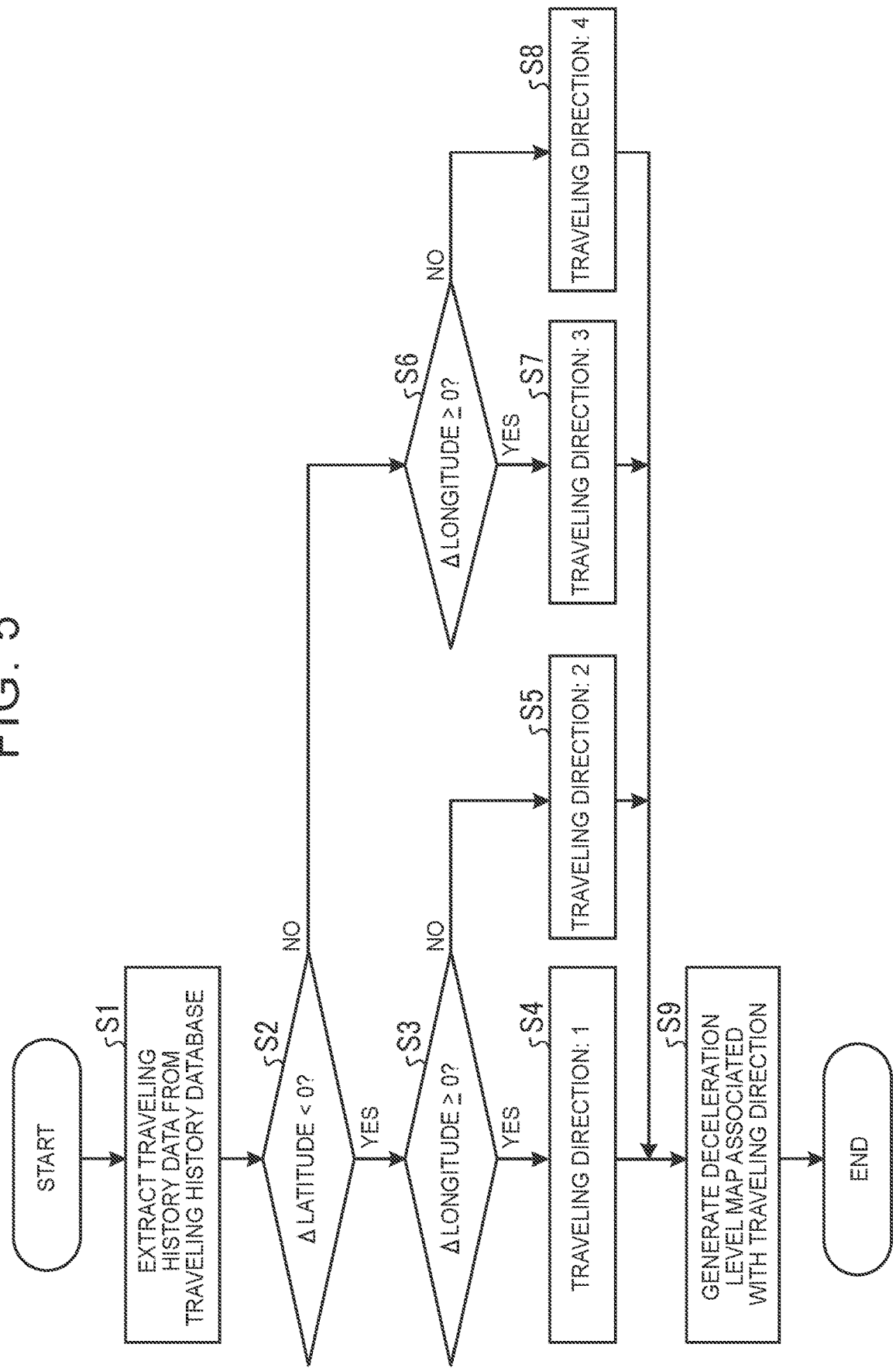
FIG. 5 is a flowchart showing a deceleration map generation process.

FIG. 5 is a flowchart showing a deceleration map generation process. The process shown in FIG. 5 is executed by the server 3.

The server 3 extracts the traveling history data from the traveling history database 4 (Step S1). In Step S1, the extracted traveling history data includes a latitude and a longitude indicating coordinates of the vehicle 2, and information indicating a deceleration at this position. As shown in FIG. 6, the extracted traveling history data (extracted data) includes a time, a longitude, a latitude, and a vehicle deceleration (G). The traveling history data shown in FIG. 6 is time-series data in increments of one second. This time-series data indicates a traveling history when the time advances in increments of one second from data D1 to data D18.

The server 3 determines whether the latitude change amount is smaller than zero based on the extracted traveling history data (Step S2). In Step S2, a latitude change amount per unit time (Δ latitude) is calculated based on the extracted data, and determination is made as to whether the change amount is smaller than zero. The calculated latitude change amount is stored as generated data in association with the time-series data. The generated data includes a longitude change amount, a latitude change amount, and a traveling direction.

For example, when the data D1 and the data D2 shown in FIG. 6 are used in Step S2, the server 3 calculates the latitude change amount (Δ latitude) by subtracting a latitude in the data D1 from a latitude in the data D2. The calculated latitude change amount is stored as a Δ latitude of the data D2. The latitude change amount obtained from the latitudes in the pieces of data D1 and D2 is smaller than zero. Therefore, a positive determination is made in the determination process of Step S2.

When determination is made that the latitude change amount is smaller than zero (Step S2: Yes), the server 3 determines whether the longitude change amount is equal to or larger than zero (Step S3). In Step S3, a longitude change amount per unit time (Δ longitude) is calculated based on the extracted data, and determination is made as to whether the change amount is equal to or larger than zero. The calculated longitude change amount is stored as generated data in association with the time-series data. In Step S3, the determination about the longitude change amount is made for the time-series data determined in Step S2.

For example, when the data D1 and the data D2 shown in FIG. 6 are used in Step S3, the server 3 calculates the longitude change amount (Δ longitude) by subtracting a longitude in the data D1 from a longitude in the data D2. The calculated longitude change amount is stored as a Δ longitude of the data D2. The longitude change amount obtained from the longitudes in the pieces of data D1 and D2 is equal to or larger than zero. Therefore, a positive determination is made in the determination process of Step S3.

When determination is made as a result of the determination in Step S3 that the longitude change amount is equal to or larger than zero (Step S3: Yes), the server 3 determines that the traveling direction of the predetermined vehicle associated with the time-series data is a first direction (Step S4). In Step S4, determination is made, regarding the deceleration in the extracted data, that the traveling direction of the vehicle associated with the deceleration is the first direction.

For example, when a positive determination is made in Step S3 about the arithmetic process using the data D1 and the data D2 shown in FIG. 6, the traveling direction of the vehicle associated with a deceleration "0.08 G" in the data D2 is set to the "first direction" in Step S4. The set traveling direction is stored as generated data in association with the time-series data.

When determination is made as a result of the determination in Step S3 that the longitude change amount is not equal to or larger than zero (Step S3: No), the server 3 determines that the traveling direction of the predetermined vehicle associated with the time-series data is a second direction (Step S5). In Step S5, determination is made, regarding the deceleration in the extracted data, that the traveling direction of the vehicle associated with the deceleration is the second direction.

When determination is made as a result of the determination in Step S2 that the latitude change amount is not smaller than zero (Step S2: No), the server 3 determines whether the longitude change amount is equal to or larger than zero (Step S6). The process of Step S6 is the same as the process of Step S3.

When determination is made as a result of the determination in Step S6 that the longitude change amount is equal to or larger than zero (Step S6: Yes), the server 3 determines that the traveling direction of the predetermined vehicle associated with the time-series data is a third direction (Step S7). In Step S7, determination is made, regarding the deceleration in the extracted data, that the traveling direction of the vehicle associated with the deceleration is the third direction.

When determination is made as a result of the determination in Step S6 that the longitude change amount is not equal to or larger than zero (Step S6: No), the server 3 determines that the traveling direction of the predetermined vehicle associated with the time-series data is a fourth direction (Step S8). In Step S8, determination is made, regarding the deceleration in the extracted data, that the traveling direction of the vehicle associated with the deceleration is the fourth direction.

When the server 3 executes any one of the processes of Steps S4, S5, S7, and S8, the server 3 generates a deceleration level map associated with the determined traveling direction (Step S9). In Step S9, the generated deceleration level map stores information related to the deceleration for each determined traveling direction. At that time, the decelerations are averaged for each predetermined range.

Figure 7:
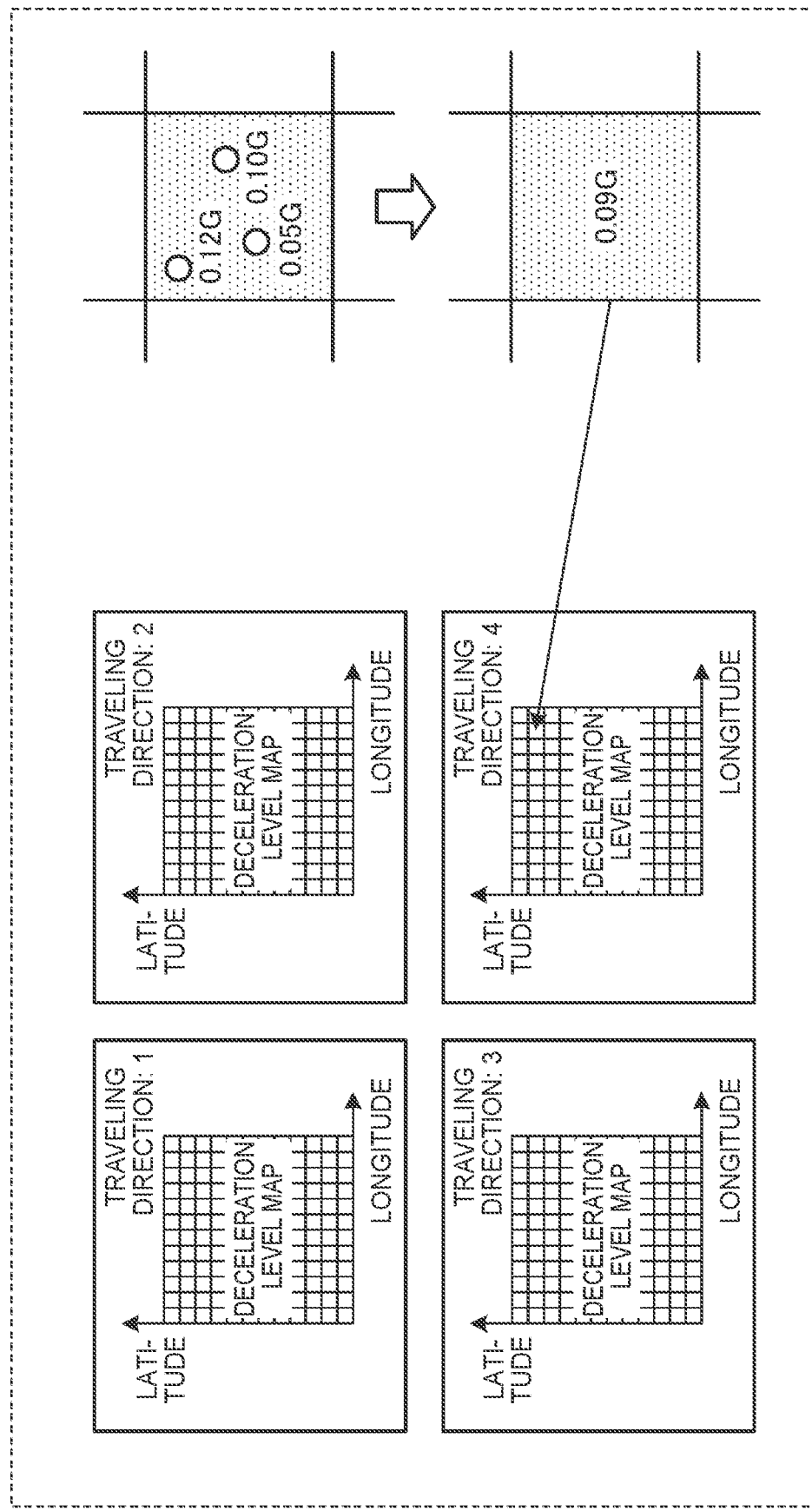
FIG. 7 is a diagram for describing a relationship between a traveling direction and a deceleration in each deceleration map.

Specifically, the server 3 separates the traveling history data into four pieces of data based on the traveling direction determination result, and calculates an average deceleration in a predetermined position coordinate range for each traveling direction as shown in FIG. 7. Thus, four deceleration level maps are generated. The deceleration level maps include a deceleration level map (first map) showing a deceleration associated with the case where the traveling direction is the first direction, a deceleration level map (second map) showing a deceleration associated with the case where the traveling direction is the second direction, a deceleration level map (third map) showing a deceleration associated with the case where the traveling direction is the third direction, and a deceleration level map (fourth map) showing a deceleration associated with the case where the traveling direction is the fourth direction. FIG. 7 illustrates an example in which decelerations at any point are averaged in the deceleration level map associated with the fourth direction. In the example shown in FIG. 7, when three pieces of data indicating decelerations "0.12 G", "0.10 G", and "0.05 G" are present in a predetermined position coordinate range, the server 3 sets a value "0.09 G" obtained by averaging these decelerations as a deceleration at that point.

When the deceleration level maps are generated in Step S9, the decelerations associated with the plurality of traveling directions are averaged and set for any point. When the process of Step S9 is executed, this control routine is terminated.

Figure 8:
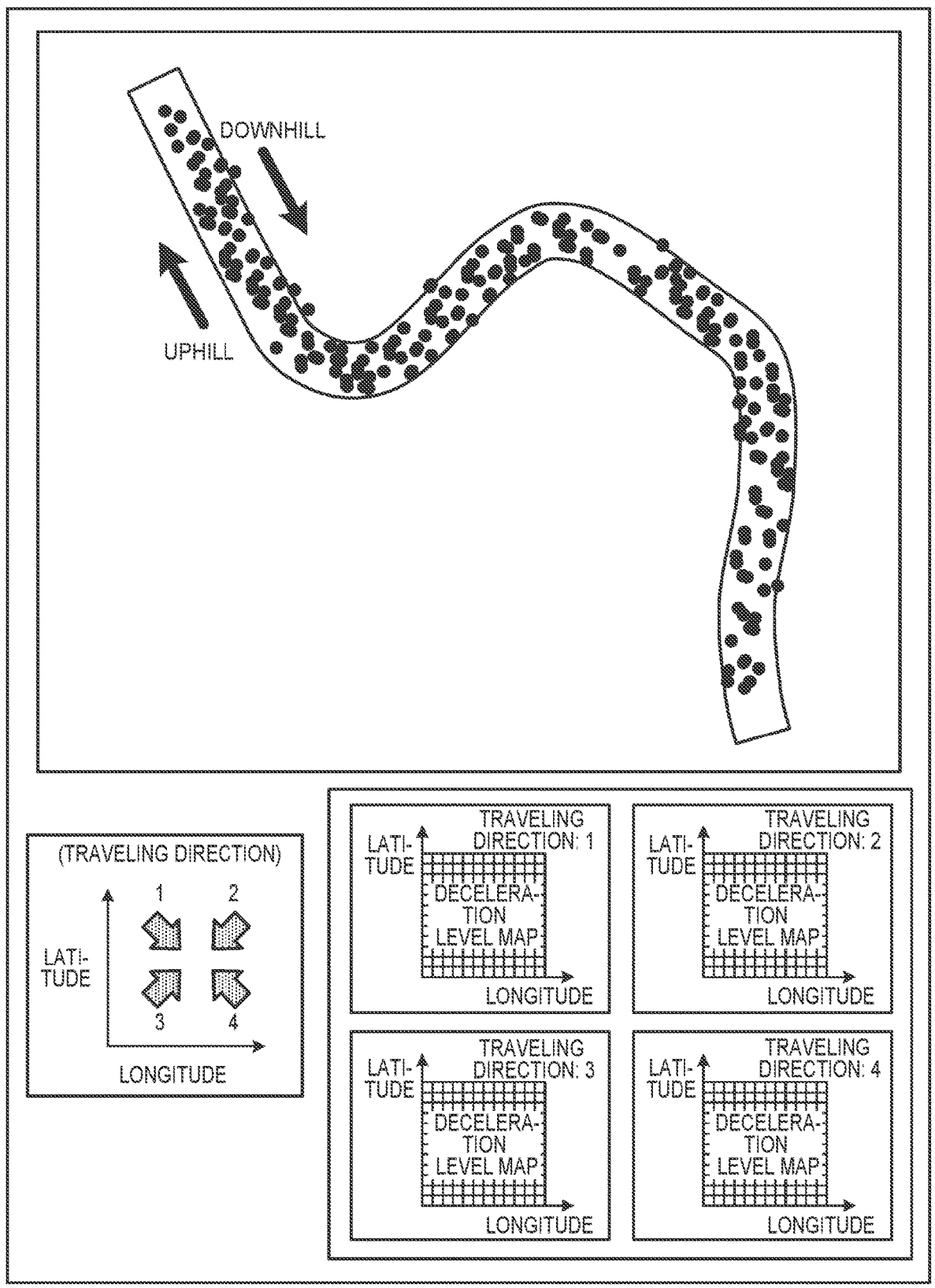
FIG. 8 is a diagram for describing raw data of the traveling history data.

According to the processing flow shown in FIG. 5, the traveling history data extracted in Step S1 is data including information indicating decelerations in various directions as shown in FIG. 8. The road illustrated in FIG. 8 is an uphill when the vehicle travels in one lane, and a downhill when the vehicle travels in the opposite lane. In FIG. 8, decelerations during the traveling on this road are plotted. The plots shown in FIG. 8 are pieces of data in which the traveling directions are not distinguished, that is, data including the first direction, the second direction, the third direction, and the fourth direction. The data shown in FIG. 8 is separated into four pieces of data for the individual traveling directions by the process shown in FIG. 5.

Figure 9:
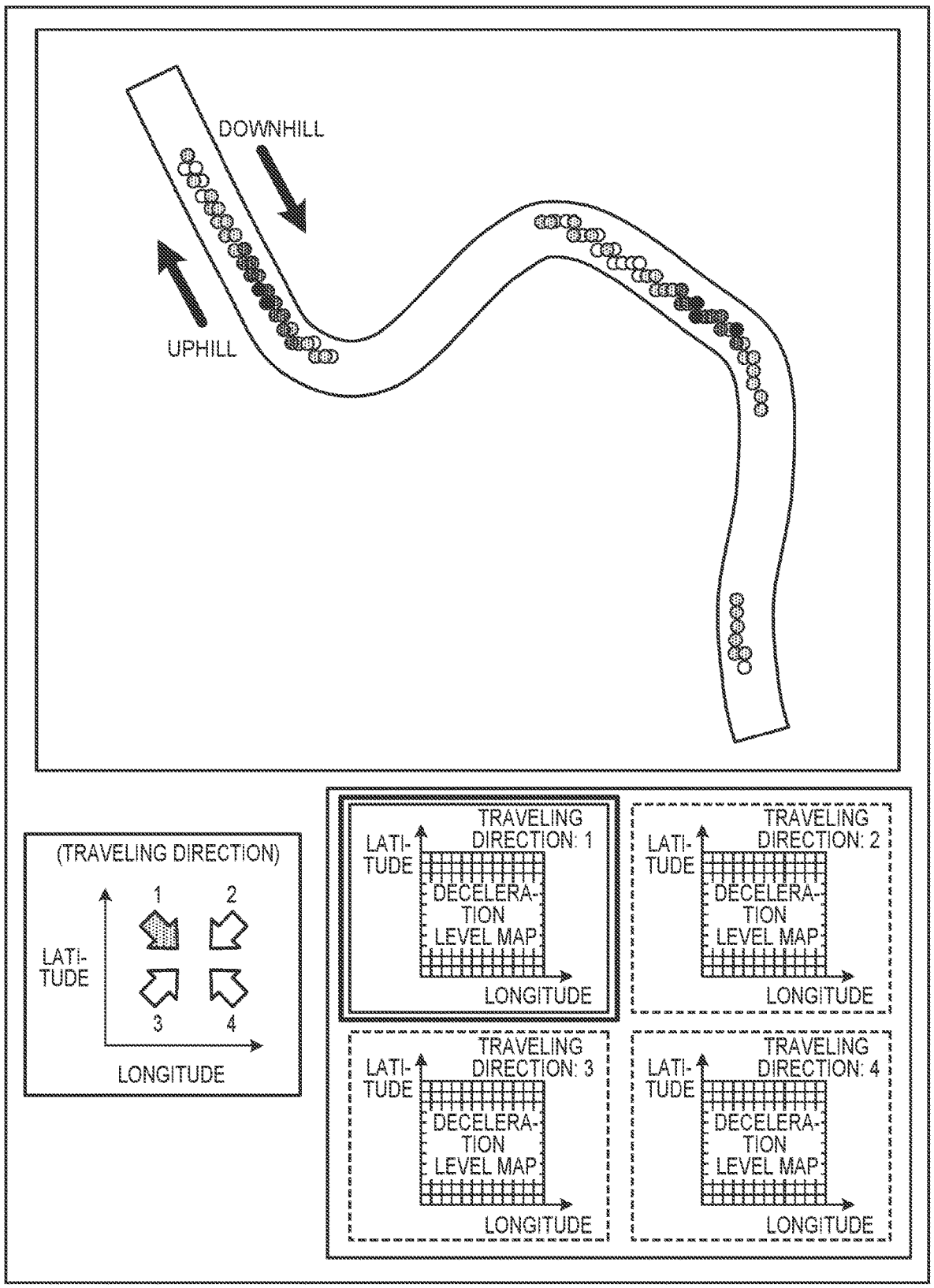
FIG. 9 is a diagram for describing information related to a first direction that is extracted from the traveling history data.

When the process proceeds from Step S4 to Step S9 in FIG. 5, the deceleration level map showing the deceleration associated with the first direction is generated as shown in FIG. 9. In FIG. 9, the first direction corresponds to a traveling direction when the vehicle travels downhill. Therefore, each plot is a deceleration when the vehicle travels downhill. The plots in this deceleration level map (first map) demonstrate that, when the vehicle travels downhill, the brake pedal is forcefully depressed before a curve to generate a great deceleration.

Figure 10:
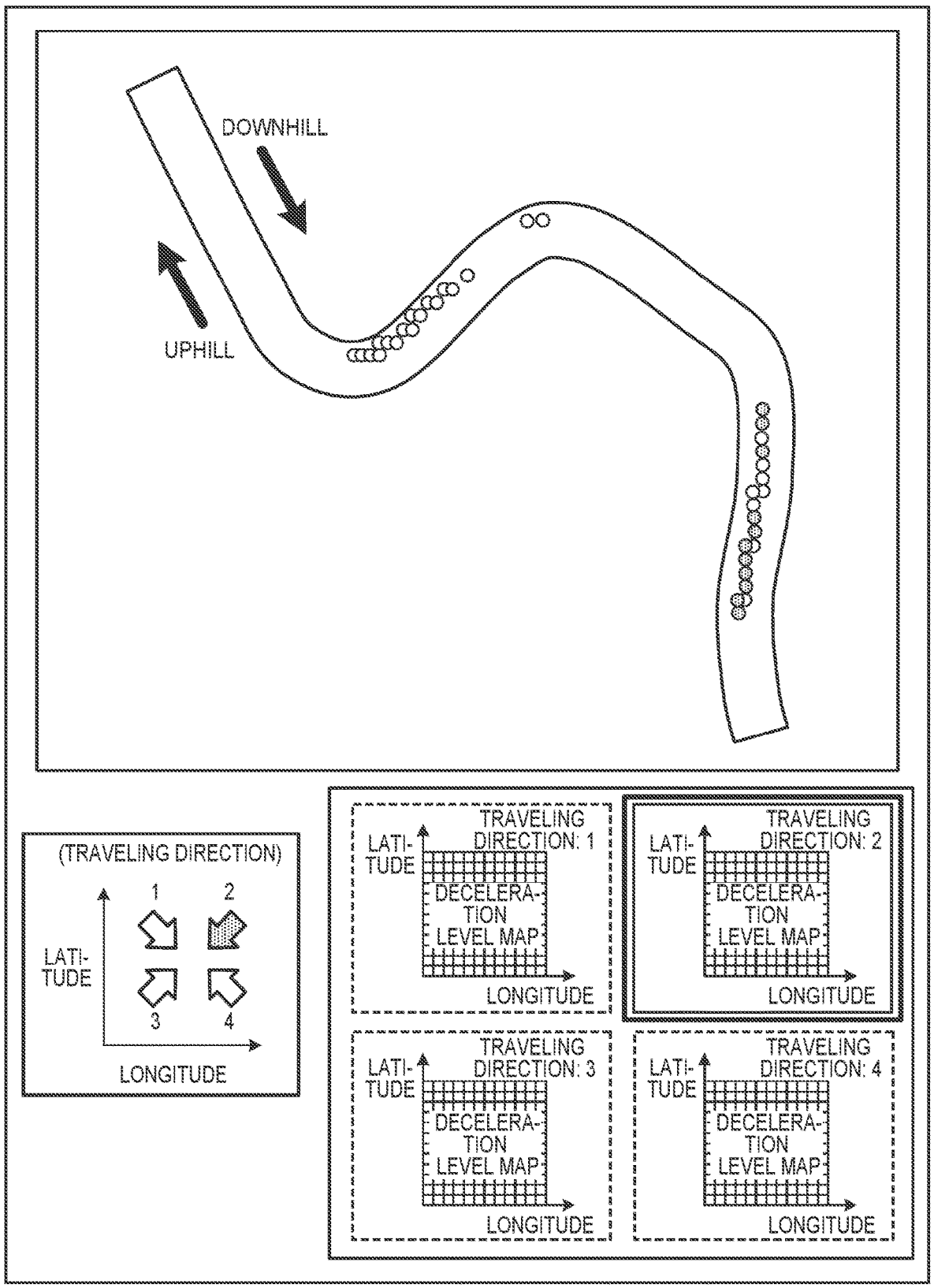
FIG. 10 is a diagram for describing information related to a second direction that is extracted from the traveling history data.

When the process proceeds from Step S5 to Step S9 in FIG. 5, the deceleration level map showing the deceleration associated with the second direction is generated as shown in FIG. 10. In FIG. 10, the second direction corresponds to a traveling direction when the vehicle travels uphill. Therefore, each plot is a deceleration when the vehicle travels uphill. The plots in this deceleration level map (second map) demonstrate that, when the vehicle travels uphill, the brake pedal is depressed before a curve to generate a deceleration.

Figure 11:
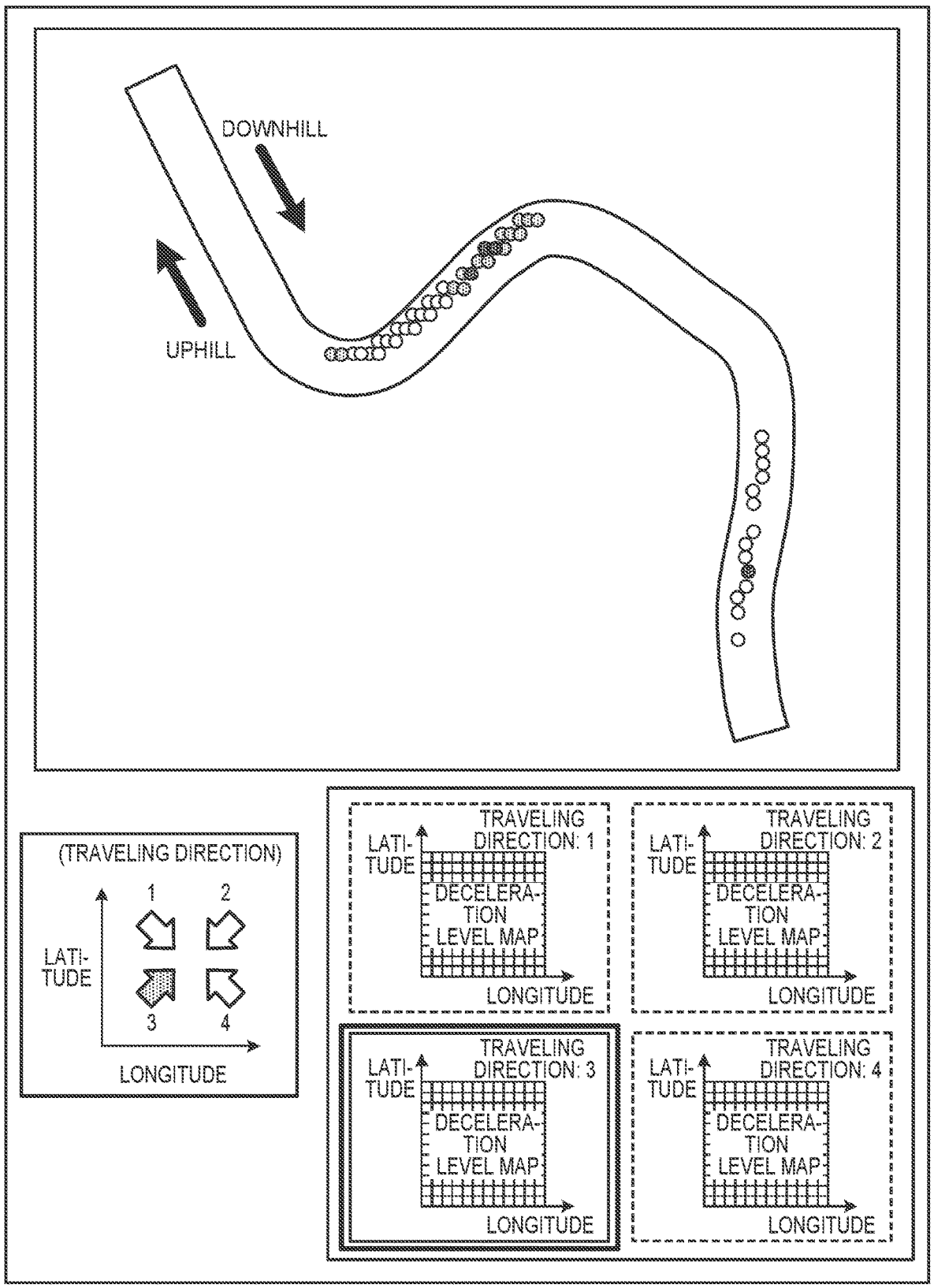
FIG. 11 is a diagram for describing information related to a third direction that is extracted from the traveling history data.

When the process proceeds from Step S7 to Step S9 in FIG. 5, the deceleration level map showing the deceleration associated with the third direction is generated as shown in FIG. 11. In FIG. 11, the third direction corresponds to a traveling direction when the vehicle travels downhill. Therefore, each plot is a deceleration when the vehicle travels downhill. The plots in this deceleration level map (third map) demonstrate that, when the vehicle travels downhill, the brake pedal is depressed before and after a curve to generate a deceleration.

Figure 12:
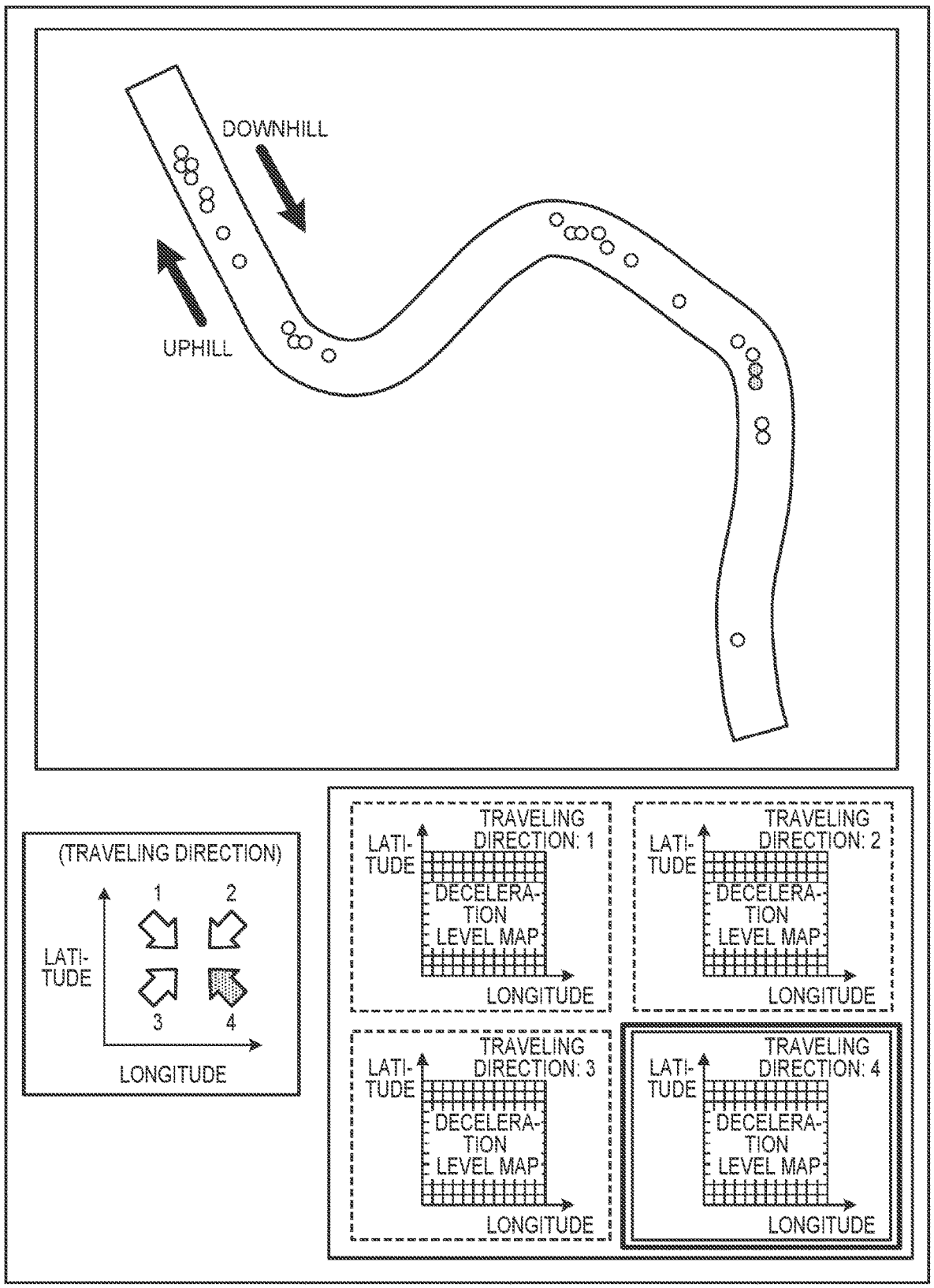
FIG. 12 is a diagram for describing information related to a fourth direction that is extracted from the traveling history data.

When the process proceeds from Step S8 to Step S9 in FIG. 5, the deceleration level map showing the deceleration associated with the fourth direction is generated as shown in FIG. 12. In FIG. 12, the fourth direction corresponds to a traveling direction when the vehicle travels uphill. Therefore, each plot is a deceleration when the vehicle travels uphill. The plots in this deceleration level map (fourth map) demonstrate that, when the vehicle travels uphill, the brake pedal is depressed midway along and after a curve to generate a deceleration.

The road shown in FIGS. 8 to 12 is the same road. The map shown in the upper part of each of FIGS. 8 to 12 including this road corresponds to a deceleration level map in a range of 1 km square. In this deceleration level map, a deceleration level is set for each range of 5 m square. The set deceleration level is an average of decelerations corresponding to the plots. The server 3 stores the generated deceleration level map in the storage unit 33 and provides the deceleration level map to the vehicle 2.

Figure 13:
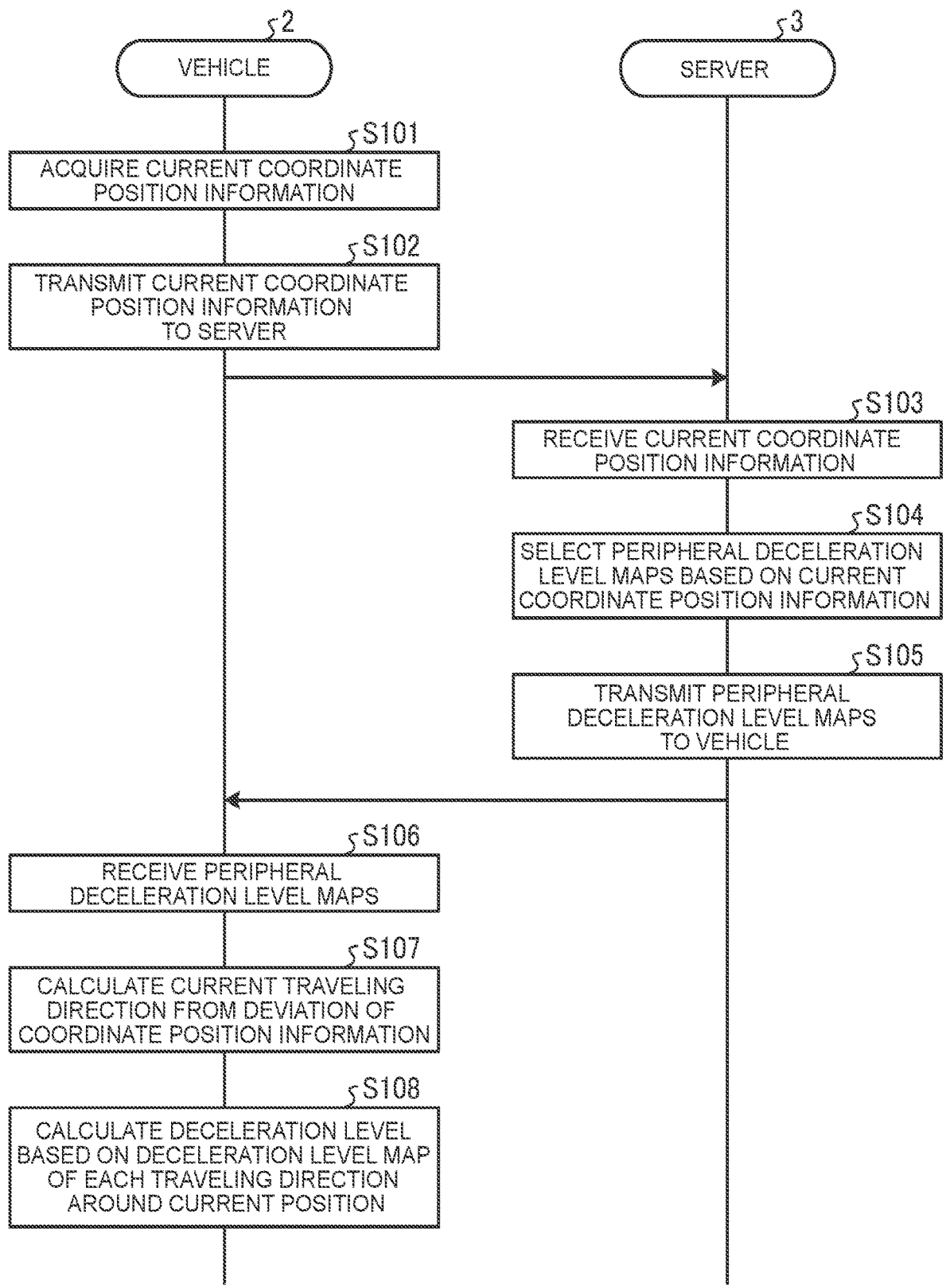
FIG. 13 is a sequence diagram showing information processing between a vehicle and a server.

FIG. 13 is a sequence diagram showing information processing between the vehicle and the server.

The vehicle 2 acquires current coordinate position information while traveling in the one-pedal mode (Step S101). In Step S101, the position coordinate acquisition device 22 acquires information indicating current position coordinates.

The vehicle 2 transmits the current coordinate position information to the server 3 (Step S102). In Step S102, information indicating the current position is transmitted from the communication unit 21 to the server 3.

The server 3 receives the current coordinate position information transmitted from the vehicle 2 (Step S103). In Step S103, the communication unit 31 receives the current coordinate position information of the vehicle 2.

Figure 14:
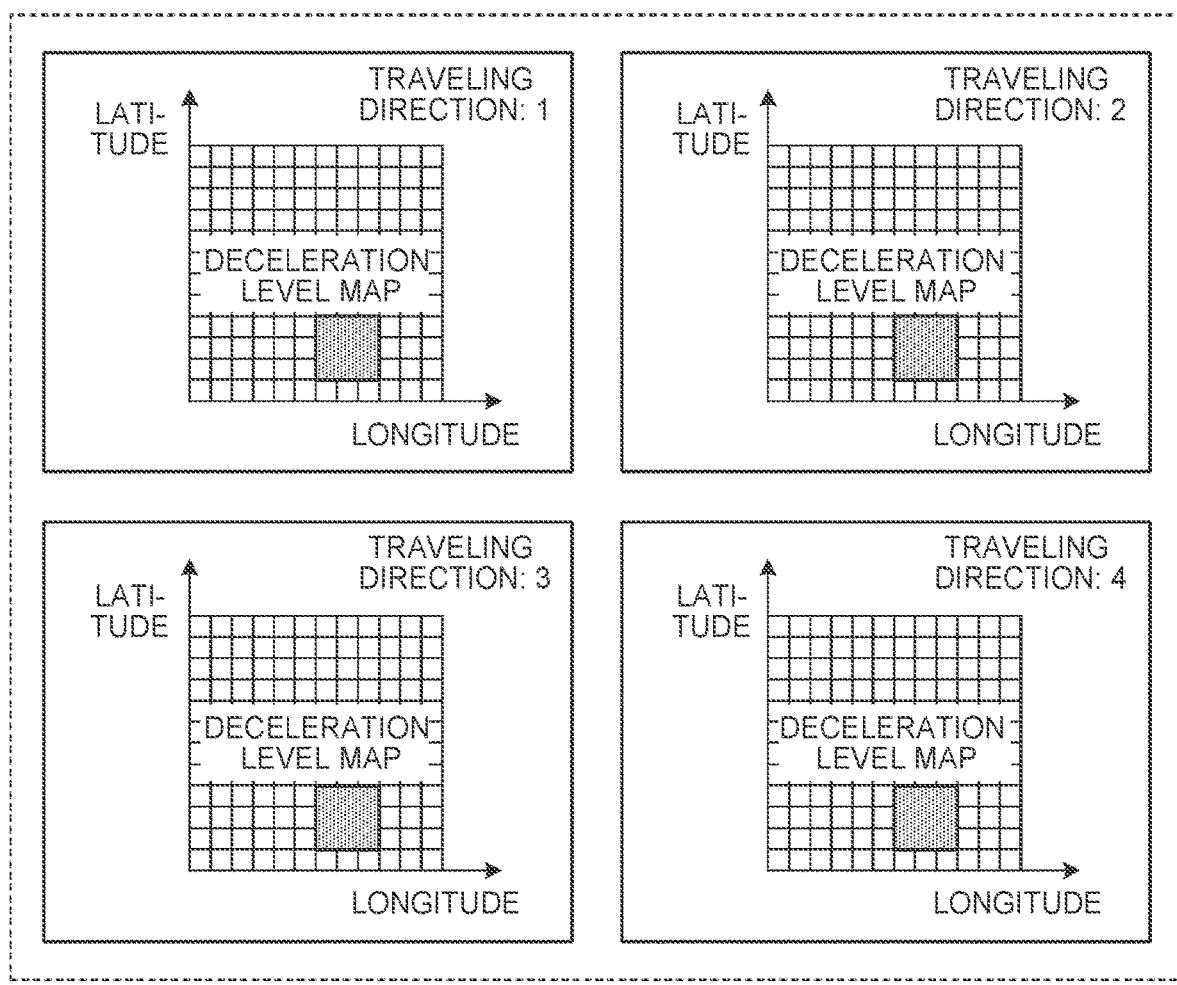
FIG. 14 is a diagram for describing deceleration maps in a peripheral range around a current position.

The server 3 selects deceleration level maps including peripheral positions based on the received current coordinate position information (Step S104). In Step S104, a partial deceleration level map in a predetermined range including the current position coordinates, for example, a range of 1 km square is selected from the deceleration level map. In this case, the predetermined range including the peripheral positions is selected for each of the four deceleration level maps of the first direction to the fourth direction regardless of the traveling directions. As shown in FIG. 14, four deceleration level maps of different traveling directions are selected for the same range. For example, a deceleration level map extracted in the range of 1 km square in association with the first direction shown in FIG. 9, a deceleration level map extracted in the range of 1 km square in association with the second direction shown in FIG. 10, a deceleration level map extracted in the range of 1 km square in association with the third direction shown in FIG. 11, and a deceleration level map extracted in the range of 1 km square in association with the fourth direction shown in FIG. 12 are selected in Step S104.

The server 3 transmits the selected peripheral deceleration level maps to the vehicle 2 (Step S105). In Step S105, the selected peripheral deceleration level maps are transmitted to the vehicle 2 that has transmitted the current coordinate position information.

The vehicle 2 receives the peripheral deceleration level maps transmitted from the server 3 (Step S106). In Step S106, the communication unit 21 receives the peripheral deceleration level maps.

The vehicle 2 calculates a current traveling direction from a deviation of the coordinates (Step S107). In Step S107, the traveling direction is calculated based on a deviation of the coordinates acquired by the position coordinate acquisition device 22.

The vehicle 2 calculates a deceleration level based on the deceleration level map of each traveling direction around the current position (Step S108). In Step S108, the deceleration level is calculated by using the deceleration level map of the direction corresponding to the current traveling direction among the four deceleration level maps received from the server 3.

Figure 15:
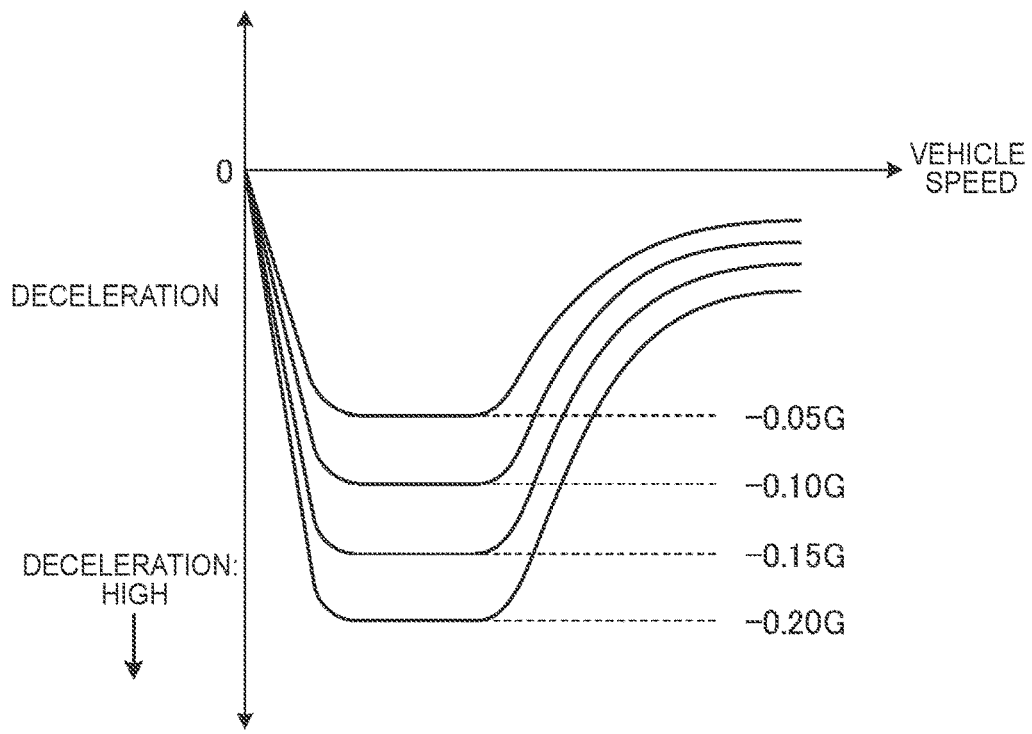
FIG. 15 is a diagram for describing deceleration levels.

The deceleration level is set so that the magnitude of the maximum deceleration generated when the accelerator pedal 26 is released varies stepwise. As shown in FIG. 15, the deceleration level is represented by a braking force map in which the maximum deceleration is set stepwise like "−0.05 G", "−0.10 G", "−0.15 G", and "−0.20 G". In the braking force map, the deceleration is determined based on the deceleration level and the vehicle speed. The ECU 23 calculates a requested deceleration by using the braking force map. That is, the ECU 23 sets the requested deceleration based on the deceleration level set based on the deceleration level map and the vehicle speed of the vehicle 2 while traveling in the one-pedal mode.

In FIG. 15, the vertical axis represents a vehicle longitudinal acceleration. The positive region represents an acceleration, and the negative region represents a deceleration. In the description of FIG. 15, a negative sign is given to the deceleration value to distinguish the acceleration and the deceleration. In the description of FIGS. 4, 6, and 7, the negative sign is not given to the deceleration value because the deceleration is not confused with the acceleration.

For example, when the current traveling direction of the vehicle 2 is determined to be the fourth direction as shown in FIG. 7 while traveling in the one-pedal mode, the requested deceleration is calculated by using the deceleration level map of the fourth direction. When the current position is in the range of 5 m square in which the deceleration "0.09 G" is set as illustrated in FIG. 7, the ECU 23 calculates "0.09 G" as the deceleration level based on the deceleration level map. The ECU 23 calculates the requested deceleration by using the vehicle speed and the braking force map in which the deceleration level is set to "0.09 G", and controls the braking device 24 based on the calculated requested deceleration.

Thus, the ECU 23 of the vehicle 2 automatically changes the setting to the deceleration level calculated based on the deceleration level map and calculates the requested deceleration based on the set deceleration level while the vehicle 2 is traveling in the one-pedal mode. That is, the deceleration level is automatically updated in accordance with a system request. Therefore, the deceleration level is automatically switched to an appropriate deceleration level based on the current traveling direction without the manual switching of the deceleration level by the driver.

As described above, according to the embodiment, the deceleration level depending on the current traveling direction can be set by sorting and extracting the data in the traveling history data depending on the traveling direction. As a result, it is possible to provide the driver with appropriate deceleration feeling depending on the traveling direction while the vehicle 2 is traveling in the one-pedal mode.

The embodiment is directed to the example in which the traveling history database 4 is provided separately from the server 3, but the present disclosure is not limited to this example. That is, the server 3 may include the traveling history database 4. In short, the storage location of the traveling history data is not particularly limited.

The embodiment is directed to the configuration in which the deceleration level maps are generated by the server 3 and the deceleration level is calculated by the vehicle 2, but the present disclosure is not limited to this configuration. As a modification, the server 3 may perform processes up to the deceleration level calculation process, or the vehicle 2 may perform processes from the deceleration level map generation process.

Figure 16:
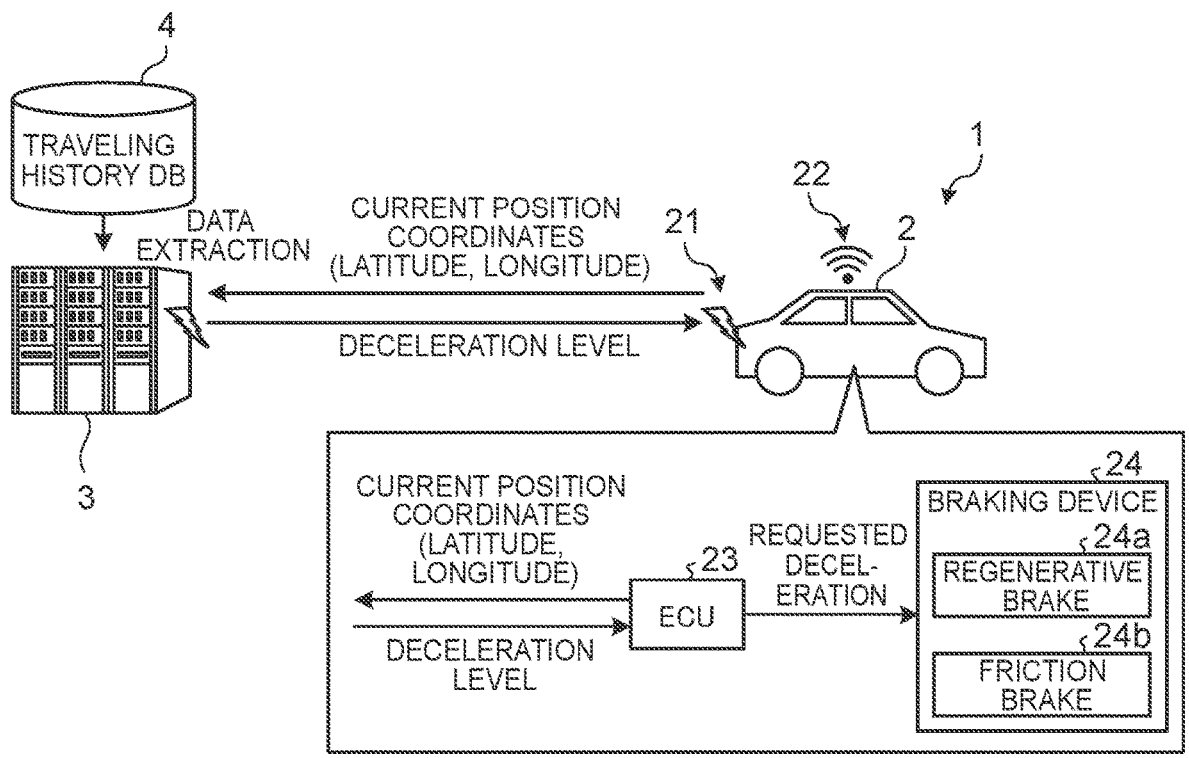
FIG. 16 is a diagram schematically showing an overall configuration of a vehicle control system according to a first modification.

FIG. 16 is a diagram schematically showing an overall configuration of a vehicle control system according to a first modification. In the first modification, the server 3 performs the deceleration level map generation process and the deceleration level calculation process. When the server 3 receives current coordinate position information from the vehicle 2, the server 3 determines a traveling direction of the vehicle 2 based on a deviation of coordinates. The server 3 calculates a deceleration level associated with the current position and the determined traveling direction of the vehicle 2 by using the deceleration level map associated with the traveling direction. The calculated deceleration level is transmitted from the server 3 to the vehicle 2. The vehicle 2 acquires the deceleration level calculated by the server 3 and sets a requested deceleration based on the deceleration level while traveling in the one-pedal mode.

Figure 17:
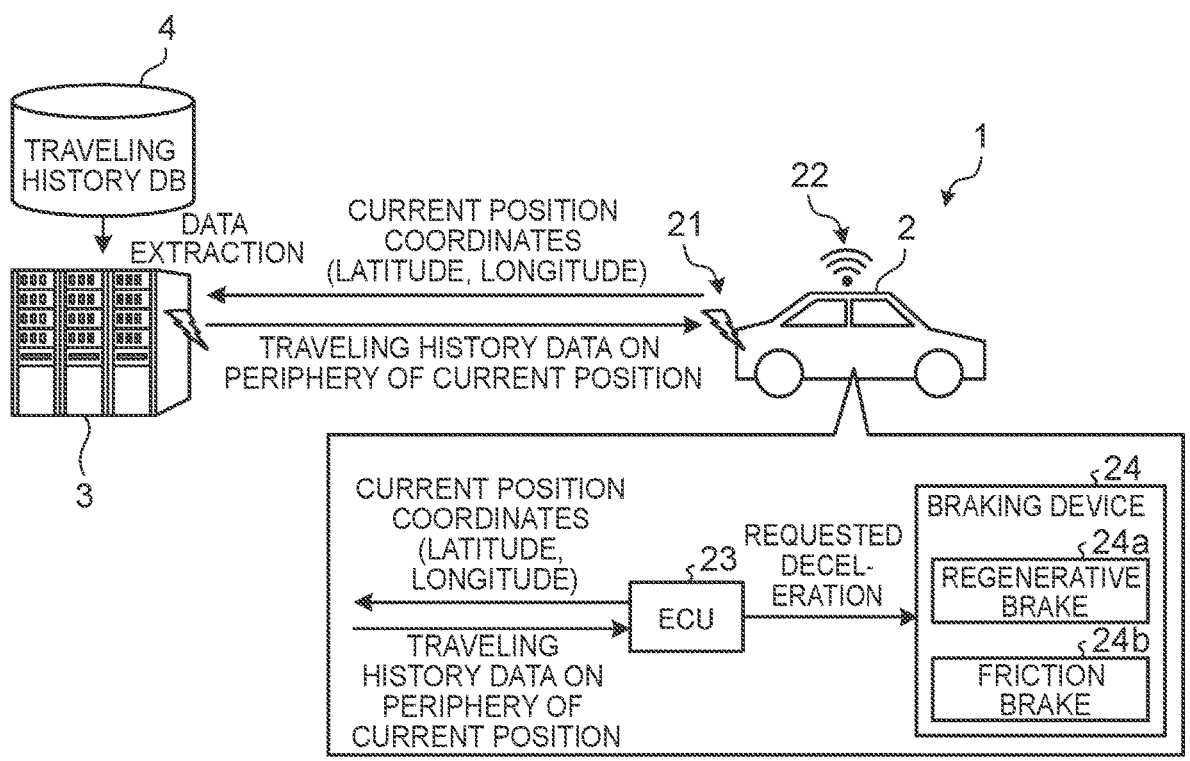
FIG. 17 is a diagram schematically showing an overall configuration of a vehicle control system according to a second modification.

FIG. 17 is a diagram schematically showing an overall configuration of a vehicle control system according to a second modification. In the second modification, the vehicle 2 performs the deceleration level map generation process and the deceleration level calculation process. The server 3 receives current coordinate position information from the vehicle 2 and transmits traveling history data associated with the periphery of the current position of the vehicle 2. While traveling in the one-pedal mode, the vehicle 2 generates deceleration level maps based on the traveling history data on the periphery of the current position that is acquired from the server 3, and calculates a deceleration level by using the deceleration level map associated with a current traveling direction.

What is claimed is:

1. A control device for a vehicle configured to travel in a one-pedal mode in which driving and braking are controlled in response to operations on only an accelerator pedal, the control device comprising an electronic control unit configured to:
    control a braking force of the vehicle by using deceleration maps in which decelerations in a plurality of traveling directions are set for any points based on traveling history data, and
    calculate, during traveling in the one-pedal mode, a deceleration level based on deceleration information associated with a current traveling direction and a current position of the vehicle among pieces of deceleration information included in the deceleration maps, wherein:
    the deceleration level includes a plurality of deceleration levels in which a maximum deceleration generated when the accelerator pedal is released is set to different magnitudes stepwise, and
    the electronic control unit is configured to
    automatically change a setting to the calculated deceleration level during the traveling in the one-pedal mode, and
    calculate a requested deceleration based on the set deceleration level when controlling the braking force of the vehicle.

2. The control device according to claim 1, wherein the electronic control unit is configured to:
    transmit current position information of the vehicle to a server during the traveling in the one-pedal mode,
    receive, from the server, the deceleration maps in a peripheral range around a current position corresponding to the position information, and calculate, during the traveling in the one-pedal mode, the deceleration level based on the deceleration information associated with the current traveling direction and the current position of the vehicle in the received deceleration maps in the peripheral range around the current position.

3. The control device according to claim 1, wherein the electronic control unit is configured to:
transmit current position information of the vehicle to a server during the traveling in the one-pedal mode,
receive, from the server, the deceleration level calculated by the server based on the position information, and
set a requested deceleration by using the received deceleration level during the traveling in the one-pedal mode.

4. The control device according to claim 1, wherein the electronic control unit is configured to:
transmit current position information of the vehicle to a server during the traveling in the one-pedal mode,
receive, from the server, the traveling history data in a peripheral range around a current position corresponding to the position information, and
generate the deceleration maps based on the received traveling history data.

5. The control device according to claim 1, wherein the traveling history data includes time information, position information, and deceleration information transmitted from a plurality of vehicles including the vehicle to a server.

6. A vehicle control system comprising:
a vehicle configured to travel in a one-pedal mode in which driving and braking are controlled in response to operations on only an accelerator pedal, and
a server configured to communicate with the vehicle, wherein:
the server is configured to
generate deceleration maps in which decelerations in a plurality of traveling directions are set for any points based on traveling history data, and
when current position information of the vehicle is received from the vehicle, transmit, to the vehicle, the deceleration maps associated with the current position information of the vehicle, and
the vehicle is configured to
transmit the current position information of the vehicle to the server during traveling in the one-pedal mode, and
calculate, when controlling a braking force of the vehicle during the traveling in the one-pedal mode, a deceleration level based on deceleration information associated with a current traveling direction and a current position of the vehicle among pieces of deceleration information included in the deceleration maps, wherein:
the deceleration level includes a plurality of deceleration levels in which a maximum deceleration generated when the accelerator pedal is released is set to different magnitudes stepwise, and
the vehicle is further configured to
automatically change a setting to the calculated deceleration level during the traveling in the one-pedal mode, and
calculate a requested deceleration based on the set deceleration level when controlling the braking force of the vehicle.

7. The vehicle control system according to claim 6, wherein:
the server is configured to, when the current position information of the vehicle is received, transmit, to the vehicle, the deceleration maps in a peripheral range around the current position of the vehicle, and
the vehicle is configured to
transmit the current position information of the vehicle to the server during the traveling in the one-pedal mode,
receive, from the server, the deceleration maps in the peripheral range around the current position corresponding to the position information, and
calculate, during the traveling in the one-pedal mode, the deceleration level based on the deceleration information associated with the current traveling direction and the current position of the vehicle among the pieces of deceleration information included in the received deceleration maps in the peripheral range around the current position.

8. The vehicle control system according to claim 6, wherein the server is configured to generate the deceleration maps in which traveling directions and decelerations of a predetermined vehicle are set for any points based on information indicating positions and the decelerations of the predetermined vehicle in the traveling history data.

* * * * *